UNITED STATES PATENT OFFICE.

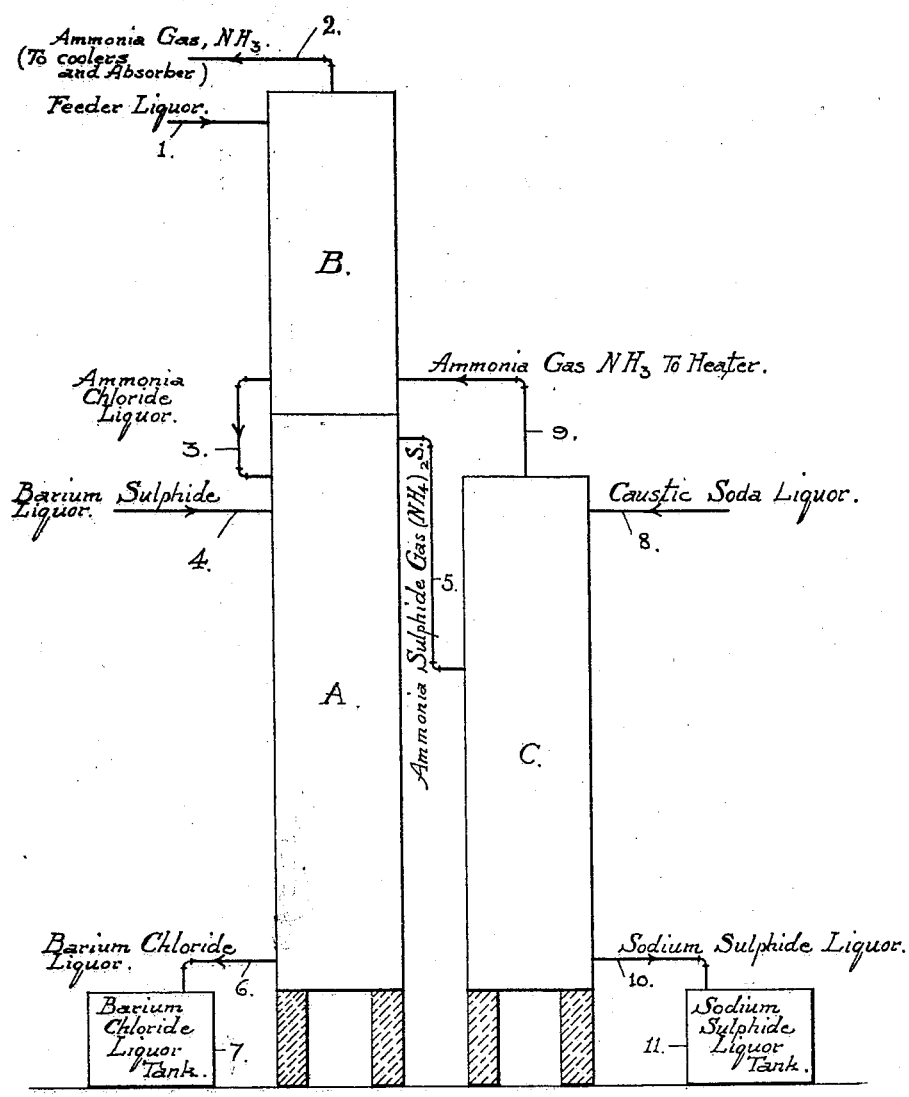

JAMES H. MacMAHON, OF SALTVILLE, VIRGINIA, ASSIGNOR TO THE MATHIESON ALKALI WORKS (INC.), OF PROVIDENCE, RHODE ISLAND, A CORPORATION OF VIRGINIA.

RECOVERY OF AMMONIA.

1,378,593.  Specification of Letters Patent.  Patented May 17, 1921.

Application filed September 3, 1919. Serial No. 321,348.

*To all whom it may concern:*

Be it known that I, JAMES H. MACMAHON, a citizen of the United States, residing at Saltville, in the county of Smyth and State of Virginia, have invented certain new and useful Improvements in the Recovery of Ammonia, of which the following is a specification.

This invention, in one of its aspects, concerns an improvement in connection with the ammonia soda process, in that it aims to effect an economical and more efficient recovery of the fixed ammonia present in the ammonium chlorid produced during the course of this process.

In another aspect, it affords a new method for the manufacture of barium chlorid, utilizing for its production the chlorin in the ammonium chlorid of the ammonia soda process, which chlorid has heretofore gone to waste in the form of calcium chlorid.

The barium chlorid, thus produced, can be used in the production of other barium salts; but the preferred mode of conducting the operation affords marketable sodium sulfid, coincidentally with the recovery of the ammonia for the ammonia soda process; so that the production of said sulfid accordingly constitutes still another object of this preferred mode of conducting my process.

These and other objects of my invention will be hereinafter referred to, and the novel combinations of steps in my process will be set forth with particularity in the claims appended hereto. Since, however, I am aware of various changes and modifications which may be made in my process without departing from the spirit of my invention, I desire to be limited only by the scope of said claims broadly interpreted in the light of my disclosure.

The details of the ammonia soda process are so well known as to render needless any lengthy preliminary discussion thereof herein. Suffice it to say, therefore,—in order to show the relation of the present process to the ammonia soda process,—that hitherto the feeder liquor coming from the sodium bicarbonate filters consisting principally of ammonium chlorid with a considerable admixture of volatile ammonia in the form of a bicarbonate,—has been delivered to the heater section of the still to free the volatile ammonia from the ammonium chlorid, or, as it is termed in the art, fixed ammonia, and this liquor has then been passed into what is known as the lime section of the still, to decompose the ammonium chlorid into $NH_3$, with simultaneous formation of calcium chlorid.

The carbonic acid gas, together with the free ammonia, descends to the distiller coolers, to condense the steam therefrom; so that the dry ammonia gas may be returned to the absorber of the ammonia soda process, for the usual treatment of the brine thereby.

The calcium chlorid with the excess lime required to complete the reaction in the lime section, and together also, usually, with more or less free ammonia, is sent from the lime section to the muck dam, where the lime is settled out. The clear calcium chlorid drawn off is waste, and furthermore, constitutes a source of expense in large works, in disposing of the same. Moreover, any free ammonia thus present in this waste liquor, is lost.

I have found that this step of separating lime from a burdensome waste product, and indeed the production of any waste product whatsoever, may be eliminated; while at the same time substantially all loss of free or fixed ammonia may be prevented. Further, certain valuable by-products may be produced in lieu of waste.

The black ash of crude barium sulfid contains about sixty per cent. of barium sulfid; and according to my process this black ash is lixiviated with water, preferably in a closed tank, and the barium sulfid solution obtained is decanted from the residue and is then used in lieu of calcium oxid in what has heretofore been, and is above, referred to as the lime section of the still, in order to decompose the ammonium chlorid present in the feeder liquor.

For convenience, I shall term the feeder liquor thus partly freed from its ammonia content,—ammonium chlorid liquor; and this is passed directly into a section of a still, which may in all substantial respects correspond in internal construction with the so-called lime section of the still used in the ammonia soda process, as heretofore operated.

Here, a reaction occurs, which may be expressed as follows:

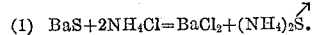

(1) $BaS + 2NH_4Cl = BaCl_2 + (NH_4)_2S$.

For convenience of description, I have shown in the accompanying drawing, which forms part hereof, a diagram, to illustrate a preferred arrangement of receptacles and connections therebetween, in which the present process may be effectuated.

Referring to this diagram, the sections designated A and B refer respectively to a distiller and heater, which, as above noted, may be of the same construction as the lime section and heater of an ammonia soda process still.

The absorbing vessel, designated C, is one in which the ammonium sulfid, formed according to equation 1, is subsequently treated to liberate the ammonia therefrom. Its internal arrangement may be similar to that of section A.

The absorber and other pieces of apparatus in common use in the ammonia soda process, and which do not directly concern the present invention, have not been shown in the drawing.

The feeder liquor from the sodium bicarbonate filters is introduced into the heater B through a pipe 1, and the ammonia gas liberated by the decomposition of the volatile bicarbonate, aforesaid, passes off through pipe 2 to the coolers and thence to the absorber, for return to the ammonia soda process.

The ammonium chlorid liquor passes from the heater into the distilling section A via pipe 3.

The barium sulfid liquor, formed as above described, flows into the distiller A through a pipe 4 and the reaction, yielding barium chlorid and ammonium sulfid, then proceeds.

The ammonium sulfid passes off in the gaseous phase through a pipe 5 into receptacle C; while the blow-off liquor from the still,—containing the so-formed barium chlorid, together with sodium chlorid as an impurity,—is sent through pipe 6 to a receiving vessel 7, marked on the diagram,—"Barium chlorid liquor tank,"—to be subsequently treated either with hydrochloric acid to convert directly into $BaCl_2$ the small amount of BaS which may be provided in excess in order to insure complete decomposition of the ammonium chlorid in the still; or said blow-off liquor may be treated with carbon dioxid to precipitate the excess sulfid as $BaCO_3$.

The barium chlorid is separated from the sodium chlorid present, by crystallization; advantage being taken of the difference in solubility of $BaCl_2$ and $NaCl$, to effect this separation. A large part of the barium chlorid can thus be obtained practically in a pure state; the mother liquor containing substantially all of the salt and a slight amount of $BaCl_2$. If the treatment be with $CO_2$, as aforesaid, then the blow-off liquor is first allowed to stand, to permit the small amount of barium sulfate, present in it, to settle out.

This barium sulfate can either be reduced to barium sulfid, as black ash, and returned to the process; or it may be used direct as blanc fixe, for which there is a market in the paint industry.

In the foregoing, mention is made of the provision of barium sulfid in excess, where the blow-off liquor is treated with hydrochloric acid, in order to complete the decomposition of the ammonium chlorid; but substantially the same thing can be accomplished by having the ammonium chlorid in excess. One or the other of the reacting substances should, however, thus be in excess; owing to the practical difficulty of being able to exactly balance the reagents without waste of time and labor. In a way, better control of the operation can be obtained when using an excess of ammonium chlorid.

The excess $NH_4Cl$ will remain in the mother liquor after crystallization of the barium and sodium salts and it will then be carried back again into the process without loss.

Still purer barium chlorid may be obtained if, instead of reacting with the barium sulfid directly upon the ammonium chlorid liquor, the ammonium chlorid is first separated from the feeder liquor by evaporation and cooling, and thereafter dissolving in hot water the pure ammonium chlorid thus obtained, and then reacting with the barium sulfid upon this solution, in the still, as per equation 1.

In this way the ammonium chlorid to be treated is freed initially from sodium chlorid and the other salts usually present in the feeder liquid, and this eliminates the necessity for the subsequent separation of sodium chlorid from the barium chlorid; the formation of barium sulfate; etc.,—referred to in the foregoing.

The ammonium sulfid gas, $(NH_4)_2S$, given off from the top of the distiller A, is then absorbed in receptacle C, preferably, in caustic soda solution, to produce sodium sulfid of marketable quality; the caustic soda liquor being introduced into the absorber C through pipe 8, while the liberated ammonia is returned to the ammonia soda process via pipe 9, which may conveniently lead back into the heater, to permit the ammonia traversing pipe 9 to pass off to the coolers and absorber along with the gas evolved in the heater.

The reaction may be expressed by the following equation:

(2) $(NH_4)_2S + 2NaOH = Na_2S + 2NH_3\uparrow + 2H_2O\uparrow$.

The operating temperature in this case is preferably not less than 80 or 90° C.; and the water formed passes off as steam as the absorber for the ammonia works under a slight vacuum. In fact, substantially all of the operations herein described are preferably carried out in solutions at their boiling temperatures, to drive off, as far as possible, all of the ammonia gas (or any residual ammonia gas, as the case may be) which may be present.

Returning now to the sodium sulfid liquor formed according to equation 2,—this passes from the absorbing vessel C through pipe 10 to the sodium sulfid liquor tank 11. Liquor is drawn from this receptacle, as needed, and the sodium sulfid is obviously readily recovered therefrom in crystalline form.

Instead of reacting upon the ammonium sulfid with caustic alkali, as per equation 2, I may, less desirably, treat it with sodium carbonate, in excess, according to the equation:

(3) $(NH_4)_2S + Na_2CO_3 = Na_2S + (NH_4)_2CO_3\uparrow$.

In this case, while ammonium carbonate is ultimately formed as indicated in the equation,—there is actually a subsidiary reaction involved, in that the ammonia, passing to the heater, comes away from the top of the absorbing vessel as $NH_3$, along with the carbon dioxid gas; but upon subsequent cooling, the $CO_2$ combines with the ammonia to form $(NH_4)_2CO_3$, and this formation of ammonium carbonate can be effected out of contact with the sodium sulfid.

The sodium sulfid produced is, however, mixed with the excess sodium carbonate, required to bring about a substantially quantitative absorption of the ammonia sulfid, as per equation 3.

Hence, the advantage of using caustic soda, as per equation 2.

A much better control of the operation than as per equation 3, is secured by reacting upon the ammonium sulfid with sodium hydrate while keeping the amount of NaOH, entering the absorbing tower, below that required to react with all of the ammonium sulfid going in; so that instead of the reaction taking place wholly as per equation 2, another and parallel reaction occurs which may be represented as follows:

(4) $NaOH + (NH_4)_2S = NaHS + 2NH_3\uparrow + H_2O\uparrow$.

For example, let us assume, in this case, that ten per cent. of the caustic alkali required to react with all of the ammonium sulfid entering the tower, is withheld. Then about ten per cent. of the sulfid liquor leaving the tower for the receiving tank, would be present as sodium sulfhydrid. The ten per cent. of caustic withheld from the tower would then be added to the liquor in the receiving tank and all of the sulfid present,—not already sodium sulfid,—would be converted into $Na_2S$, according to the equation:

(5) $NaHS + NaOH = Na_2S + H_2O$.

In conclusion, I desire to emphasize the fact that in the herein described improvement in the ammonia soda process, it is noteworthy that while the formation of waste product is thus entirely eliminated,—at the same time the ammonia recovered from the ammonium chlorid enters the brine in a form usual to the ammonia soda process.

I claim:—

1. A process for recovering ammonia vapor from the fixed ammonia present in the feeder liquor of the ammonia soda process, which comprises treating the ammonium chlorid of said liquor with the sulfid of an alkaline earth metal to form ammonium sulfid and a chlorid of said metal, separating said salts, and reacting upon the ammonium sulfid with an alkali metal oxygen compound, to liberate the ammonia in gaseous form from said ammonium sulfid.

2. A process for usefully recovering both the ammonia and chlorin contained in the ammonium chlorid present in the feeder liquor of the ammonia soda process, which comprises treating the ammonium chlorid of said liquor with barium sulfid to form ammonium sulfid and barium chlorid, separating said salts and reacting upon the ammonium sulfid with an alkali metal oxygen compound, to liberate the ammonia in gaseous form from said ammonium sulfid.

3. A process for recovering ammonia from the ammonium chlorid of the ammonia soda process, which comprises treating said ammonium chlorid with barium sulfid to form ammonium sulfid and barium chlorid, separating said salts and reacting upon the ammonium sulfid with the hydrate of an alkali metal, to liberate the ammonia in gaseous form while simultaneously producing a sulfid of said alkali metal.

4. A process for recovering ammonia vapor from the fixed ammonia present in the feeder liquor of the ammonia soda process, which comprises treating said liquor to separate the ammonium chlorid therefrom in substantially pure crystalline condition, forming a solution of said ammonium chlorid, and reacting upon the dissolved chlorid with a sulfur compound the metal base of which is capable of uniting with chlorin, to form a chlorid of said metal base and a sulfur compound of ammonium and dissociating said ammonium sulfur compound to obtain ammonia therefrom in vaporous form.

5. The process which comprises converting ammonium chlorid into ammonium sulfid, separating the latter in the gaseous phase from the residues of the reaction, and causing said gaseous ammonium sulfid to react with caustic alkali, thereby liberating ammonia while simultaneously producing a sulfid of the alkali metal which forms the base of said caustic alkali.

6. The process which comprises converting ammonium chlorid into ammonium sulfid, separating the latter in the gaseous phase from the residues of the reaction, and causing said ammonium sulfid to react with an oxygen compound of an alkali metal, thereby liberating ammonia while simultaneously producing a sulfur compound of said alkali metal.

7. The method consisting in mixing solutions of ammonium chlorid and barium sulfid in the presence of sufficient heat to drive off the ammonium sulfid gas so formed, and then absorbing the ammonium sulfid gas in a solution of caustic soda and separating the ammonia gas and the sodium sulfid resulting from the reaction.

8. A process for recovering ammonia from ammonium chlorid which comprises reacting upon said chlorid in a hot solution with a sulfur compound the metal base of which is capable of uniting with chlorin, to form a chlorid of said metal base and a sulfur compound of ammonium, and dissociating said ammonium-sulfur compound to obtain ammonia therefrom in vaporous form, by reacting upon said ammonium-sulfur compound with caustic alkali.

9. A process for recovering ammonia from ammonium chlorid which comprises reacting upon said chlorid in a hot solution with a sulfur compound the metal base of which is capable of uniting with chlorin, to form a chlorid of said metal base and a sulfur compound of ammonium, and dissociating said ammonium-sulfur compound to obtain ammonia therefrom in vaporous form, by reacting upon said ammonium-sulfur compound with caustic soda to form sodium sulfid.

10. A process for recovering ammonia from ammonium chlorid which comprises reacting upon said chlorid with barium sulfid, in a solution heated above 80° C., to form barium chlorid and ammonium sulfid, separating the latter from the former while said ammonium sulfid is in gaseous condition, and reacting upon said gaseous sulfid with a similarly heated solution of caustic soda, to liberate ammonia vapor and form sodium sulfid.

11. A process of recovering ammonia from ammonium chlorid which comprises converting said chlorid into ammonium sulfid, then converting said ammonium sulfid into free ammonia and a mixture of a plurality of sulfur compounds in the base of each of which is present an alkali metal, recovering said free ammonia and reacting upon said mixture with the hydrate of an alkali metal to convert said mixture of sulfur compounds, into a single alkali-sulfur compound.

12. A process of recovering ammonia from ammonium chlorid which comprises converting said chlorid into ammonium sulfid, and then converting the latter, in part at least, into an alkali metal sulfhydrid, while liberating free ammonia.

13. The improvement in the ammonia soda process which comprises treating the ammonium chlorid produced during the course of said process, to convert said chlorid into ammonium sulfid, then dissociating said sulfid to liberate free ammonia therefrom, separating said free ammonia from the sulfur bearing residues of the last mentioned reaction, and returning said free ammonia to the ammonia soda process for absorption in brine.

14. The improvement in the ammonia soda process which comprises treating the ammonium chlorid produced during the course of said process, to convert said chlorid into ammonium sulfid, then dissociating said sulfid to liberate therefrom free ammonia while combining the sulfur of said sulfid with a base forming element.

15. The improvement in the ammonia soda process which comprises treating the ammonium chlorid produced during the course of said process to convert said chlorid into ammonium sulfid, then dissociating said sulfid to liberate therefrom free ammonia while chemically incorporating substantially the entire sulfur content of said sulfid in a plurality of compounds of a base forming element.

16. The improvement in the ammonia soda process which comprises treating the ammonium chlorid produced during the course of said process with a sulfur compound to convert said chlorid into ammonium sulfid, then dissociating said sulfid with a compound of an alkali metal to liberate therefrom free ammonia.

17. A process for recovering ammonia vapor from the fixed ammonia present in the feeder liquor of the ammonia soda process, which comprises treating said liquor to separate the ammonium chlorid therefrom in substantially pure crystalline condition, forming a solution of said ammonium chlorid, and reacting upon the dissolved chlorid with a sulfur compound the metal base of which is capable of uniting with chlorin, to form a chlorid of said metal base and a sulfur compound of ammonium, and dissociating said ammonium sulfur compound by reacting upon the same with an alkali metal compound to obtain ammonia therefrom in vaporous form.

18. The improvement in the ammonia soda process which comprises treating the ammonium chlorid produced during the course of said process, with a sulfur compound, to convert said chlorid into ammonium sulfid, then dissociating said sulfid with an alkali metal compound to liberate free ammonia therefrom, separating said free ammonia from the sulfur bearing residues of the last mentioned reaction, and returning said free ammonia to the ammonia soda process for absorption in brine.

19. The method consisting in reacting upon ammonium chlorid with a metal sulfid the metal base of which is capable of uniting with chlorin, forming a chlorid of said metal base and ammonium sulfid, and reacting upon the ammonium sulfid with a hydroxid of the alkali metal, thereby liberating ammonia and forming a sulfid of the alkali metal.

20. The method consisting in treating ammonium chlorid with a sulfid of an alkaline earth metal in the presence of sufficient heat to drive off the ammonium sulfid gas produced, and absorbing the ammonium sulfid gas so formed in a solution of caustic soda to directly liberate ammonia and produce sodium sulfid.

21. The method consisting in separating the ammonium chlorid from the feeder liquor of the ammonia soda process, forming a solution of the ammonium chlorid, reacting upon the said solution with a sulfid of an alkaline earth metal, driving off the ammonium sulfid gas resulting from said reaction, and absorbing the said ammonium sulfid gas in a caustic soda solution, thereby liberating ammonia gas and forming sodium sulfid.

22. The method consisting in separating the ammonium chlorid from the feeder liquor of the ammonia soda process, forming a solution of the ammonium chlorid, reacting upon the said solution with barium sulfid, driving off the ammonium sulfid gas resulting from said reaction, absorbing the said ammonium sulfid gas in a caustic soda solution, thereby liberating ammonia gas and forming sodium sulfid, heating sufficiently to drive off the liberated ammonia gas, and then concentrating the solution of sodium sulfid.

In testimony whereof I have affixed my signature, in the presence of two witnesses.

JAMES H. MacMAHON.

Witnesses:
 CHAS. E. WILEY,
 JAMES H. MOORE.